(12) United States Patent
Park et al.

(10) Patent No.: US 10,084,748 B2
(45) Date of Patent: Sep. 25, 2018

(54) METHOD AND APPARATUS FOR REQUESTING OR PROVIDING RESOURCE BY TERMINAL OF SERVER IN WIRELESS COMMUNICATION SYSTEM

(71) Applicant: LG ELECTRONICS INC., Seoul (KR)

(72) Inventors: Seungkyu Park, Anyang-si (KR); Seongyun Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 274 days.

(21) Appl. No.: 14/774,608

(22) PCT Filed: Dec. 20, 2013

(86) PCT No.: PCT/KR2013/011947
§ 371 (c)(1),
(2) Date: Sep. 10, 2015

(87) PCT Pub. No.: WO2014/163280
PCT Pub. Date: Oct. 9, 2014

(65) Prior Publication Data
US 2016/0036776 A1    Feb. 4, 2016

Related U.S. Application Data

(60) Provisional application No. 61/808,586, filed on Apr. 4, 2013.

(51) Int. Cl.
*G06F 15/16* (2006.01)
*H04L 29/12* (2006.01)
*H04L 29/08* (2006.01)

(52) U.S. Cl.
CPC ............ *H04L 61/303* (2013.01); *H04L 67/02* (2013.01); *H04L 67/10* (2013.01); *H04L 67/1095* (2013.01); *H04L 67/2842* (2013.01)

(58) Field of Classification Search
CPC .......... H04L 2463/145; H04L 41/0233; H04L 61/303; H04W 4/02
See application file for complete search history.

(56) References Cited

U.S. PATENT DOCUMENTS

2005/0010552 A1   1/2005 Kaappa et al.
2006/0015626 A1   1/2006 Hallamaa et al.
(Continued)

FOREIGN PATENT DOCUMENTS

| CN | 102017687 | 4/2011 |
| CN | 102904743 | 1/2013 |
| WO | 2012/124999 | 9/2012 |

OTHER PUBLICATIONS

PCT International Application No. PCT/KR2013/011947, Written Opinion of the International Searching Authority dated Apr. 3, 2014, 22 pages.
(Continued)

*Primary Examiner* — Tauqir Hussain
*Assistant Examiner* — Kamran Mohammadi
(74) *Attorney, Agent, or Firm* — Lee Hong Degerman Kang & Waimey (57) ABSTRACT

A method for processing a request for MO data using a cache validator (CV) allocated to an MO instance according to an embodiment of the present invention, comprises the steps of: receiving uniform resource identifier (URI) information to identify the MO data of requesting certain MO data of the MO instance from a server; determining whether the URI information includes a first CV; transmitting the requested certain MO data to the server when the URI information does not include the first CV; and transmitting a second CV for the MO instance when the URI information indicates a root node of the MO instance, wherein the MO instance has a tree structure consisting of at least one node; the MO data
(Continued)

comprises the name, value and structure of a node included in the MO instance, and the method is performed by a terminal.

14 Claims, 6 Drawing Sheets

(56) References Cited

U.S. PATENT DOCUMENTS

| | | | |
|---|---|---|---|
| 2008/0229025 A1* | 9/2008 | Plamondon | G06F 12/0862 711/126 |
| 2011/0295947 A1* | 12/2011 | Yu | H04L 41/0803 709/203 |
| 2013/0031262 A1 | 1/2013 | Yu et al. | |
| 2013/0078984 A1* | 3/2013 | Luo | H04L 41/0233 455/418 |

OTHER PUBLICATIONS

PCT International Application No. PCT/KR2013/011947, Written Opinion of the International Searching Authority dated Apr. 3, 2014, 14 pages.
State Intellectual Property Office of the People's Republic of China Application Serial No. 201380075406.X, Office Action dated May 24, 2017, 12 pages.

\* cited by examiner

FIG. 1

| | | | |
|---|---|---|---|
| S101-a | Request | GET http://www.server.com/a.jpg HTTP/1.1<br>// other headers here | S101-b |
| S102-a | Response | HTTP/1.1 200 OK<br>...<br>ETag: "68689 7696a7c876b7e"<br>...<br>// start of body | S102-b |
| S103-a | Request | GET http://www.server.com/a.jpg HTTP/1.1<br>...<br>If-None-Match: "68689 7696a7c876b7e"<br>... | S103-b |
| S104-a | Response | HTTP/1.1 304 Not Modified | S104-b |

| | | | |
|---|---|---|---|
| | Request | GET http://www.server.com/a.jpg HTTP/1.1<br>// other headers here | |
| | Response | HTTP/1.1 200 OK<br>...<br>Last-Modified: Tue, 15 Nov 1994 12:45:26 GMT<br>...<br>// start of body | |
| | Request | GET http://www.server.com/a.jpg HTTP/1.1<br>...<br>If-Modified-Since: Tue, 15 Nov 1994 12:45:26 GMT<br>... | |
| | Response | HTTP/1.1 304 Not Modified | |

METHOD AND APPARATUS FOR REQUESTING OR PROVIDING RESOURCE BY TERMINAL OF SERVER IN WIRELESS COMMUNICATION SYSTEM

CROSS-REFERENCE TO RELATED APPLICATIONS

This application is the National Stage filing under 35 U.S.C. 371 of International Application No. PCT/KR2013/011947, filed on Dec. 20, 2013, which claims the benefit of U.S. Provisional Application No. 61/808,586, filed on Apr. 4, 2013, the contents of which are all hereby incorporated by reference herein in their entirety.

TECHNICAL FIELD

The present invention relates to a method and apparatus for requesting a resource or a resource by a server in a wireless communication system, or providing, and more particularly to a method and apparatus for requesting or providing a resource using a cache validator (CV).

BACKGROUND ART

In general, a DM (device management) technology corresponds to a technology capable of changing configuration of a specific device in a manner that a device management server remotely controls variables stored in the specific device or a value of an object using an efficient method. Ongoing effort to develop the DM technology as an international standard is in progress by OMA (Open Mobile Alliance) based on SynchML Data Synchronization written in SynchML Initiative (Synchronization Markup Language) forum and the DM technology has been already accepted by a different standardization group and worldwide communication service providers as a future device management technology standard. Compared to a different device management technology, the OMA device management technology includes such a standard supporting various functions as a device management protocol standard, a standard for a device management document expression scheme, a standard for binding with a transmission protocol, a standard for a device management tree and a device management node, a standard for a DDF (device description framework), a standard for notification and the like.

The device management can be performed in a manner that a device management server (DMS) transmits a command for a management object (MO) existing at the inside of a device to the device and a device management client (DMC) of the device performs the command. The DMC corresponds to an entity configured to receive the command from the DMS and perform the command in a manner of being mounted on the device. The MO is logically connected with a management tree (or tree) or a node of the tree existing at the inside of the device. Hence, the device management server can control the MO, which becomes a target of a command, or a tree or a node related to the MO by the command for the MO. The MO generally exists at a database of the device and the device management server can indicate a management command in a manner of accessing the MO via URI of the tree or the node.

DISCLOSURE

Technical Problem

An object of the present invention is to provide a method and apparatus for requesting a UE resource by a server in a wireless communication system, and a method and apparatus for providing a UE resource by a server in a wireless communication system.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The objects of the present invention can be achieved by providing a method for processing a request of Management Object (MO) data using a cache validator (CV) allocated to an MO instance, wherein the method is performed by a mobile terminal, the MO instance is composed of a tree structure including one or more nodes, and the MO data includes a name, a value, and a structure of a node included in the MO instance, the method including: receiving a request including URI (Uniform Resource Identifier) information identifying specific MO data for acquiring the specific MO data of the MO instance from a server; and determining whether a first CV is included in the URI information, wherein, if the first CV is not included in the URI information, the method further comprising: transmitting the requested specific MO data to the server; and if the URI information indicates a root node of the MO instance, transmitting a second CV for the MO instance.

Preferably, the method may further include: if the first CV is included in the URI information, verifying the first CV; if it is verified that the first CV is valid, transmitting a result indicating validity of the first CV to the server; and if it is verified that the first CV is not valid, transmitting the requested specific MO data to the server, and if the URI information indicates a root node of the MO instance, transmitting the second CV for the MO instance.

Preferably, the method may further include: if the MO instance is changed, updating the second CV for the MO instance.

Preferably, the MO instance may be cacheable.

Preferably, the first CV may be provided by a specific field included in the URI.

Preferably, if the MO instance is not changed, it is verified that the first CV may be valid.

In accordance with another aspect of the present invention, a method for requesting Management Object (MO) data using a cache validator (CV) allocated to an MO instance, wherein the method is performed by a server, the MO instance is composed of a tree structure including one or more nodes, and the MO data includes a name, a value, and a structure of a node included in the MO instance includes: transmitting a request including URI (Uniform Resource Identifier) information identifying specific MO data for acquiring the specific MO data of the MO instance to a mobile terminal; if the server knows a first CV for the MO instance, including the first CV into the URI information; if the server does not know the first CV for the MO instance, preventing the first CV from being included in the URI information; and if the first CV is not included in the URI information, receiving the requested specific MO data from the mobile terminal, and if the URI information indicates a root node of the MO instance, receiving a second CV for the MO instance.

Preferably, the method may further include: if the first CV is included in the URI information, the first CV is verified by the mobile terminal; if it is verified that the first CV is valid, receiving a result indicating validity of the first CV from the mobile terminal; and if it is verified that the first CV is not valid, receiving the requested specific MO data from the mobile terminal, and if the URI information indicates a root node of the MO instance, receiving the second CV for the MO instance from the mobile terminal.

Preferably, if a specific resource included in the MO instance is changed, the second CV for the MO instance is updated.

Preferably, the MO instance may be cacheable.

Preferably, the first CV may be provided by a specific field included in the URI.

Preferably, if the MO instance is not changed, it is verified that the first CV may be valid.

In accordance with another aspect of the present invention, a mobile terminal for processing a request of Management Object (MO) data using a cache validator (CV) allocated to an MO instance, wherein the MO instance is composed of a tree structure including one or more nodes, and the MO data includes a name, a value, and a structure of a node included in the MO instance includes: a radio frequency (RF) unit; and a processor configured to control the RF unit, wherein the processor receives a request including URI (Uniform Resource Identifier) information identifying specific MO data for acquiring the specific MO data of the MO instance from a server, and determines whether a first CV is included in the URI information, and wherein the processor transmits the specific MO data to the server when the first CV is not contained in the URI information, and transmits a second CV for the MO instance when the URI information indicates a root node of the MO instance.

In accordance with another aspect of the present invention, a server for requesting Management Object (MO) data using a cache validator (CV) allocated to an MO instance, wherein the MO instance is composed of a tree structure including one or more nodes, and the MO data includes a name, a value, and a structure of a node included in the MO instance includes: a radio frequency (RF) unit; and a processor configured to control the RF unit, wherein the processor is configured to transmit a request including URI (Uniform Resource Identifier) information identifying specific MO data for acquiring the specific MO data of the MO instance to a mobile terminal, and include a first CV into the URI information when the server knows the first CV for the MO instance; and wherein the processor receive the requested specific MO data from the mobile terminal when the server does not know the first CV for the MO instance, and receive a second CV for the MO instance when the URI information indicates a root node of the MO instance.

It is to be understood that both the foregoing general description and the following detailed description of the present invention are exemplary and explanatory and are intended to provide further explanation of the invention as claimed.

Advantageous Effects

According to exemplary embodiments of the present invention, the present invention can efficiently manage a method for requesting a resource by a server and a method for providing a resource to the server.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Reference will now be made in detail to the preferred embodiments of the present invention, examples of which are illustrated in the accompanying drawings. The following detailed description of the invention includes details to aid in full understanding of the present invention. Those skilled in the art will appreciate that the present invention can be implemented without these details.

In some cases, to prevent the concept of the present invention from being obscured, structures and apparatuses of the known art will be omitted, or will be shown in the form of a block diagram based on main functions of each structure and apparatus. In addition, wherever possible, the same reference numbers will be used throughout the drawings and the specification to refer to the same or like parts.

In the present invention, devices for device-to-device communication, that is, M2M devices, may be fixed or mobile and include devices which communicate with a server for device-to-device communication, that is, an M2M server to transmit/receive user data and/or various types of control information. The M2M devices may be referred to as terminal equipment, mobile stations (MSs), mobile terminals (MTs), user terminals (UTs), subscriber stations (SSs), wireless devices, personal digital assistants (PDA), wireless modems, handheld devices and the like. In the present invention, the M2M server refers to a fixed station which communicates with M2M devices and/or other M2M servers, and exchanges various types of data and control information with M2M devices and/or other M2M servers by communicating with the M2M devices and/or other M2M servers.

A description will be given of the background associated with the present invention.

Device Management

Device management (DM) refers to management of device configuration and other managed objects of devices from the point of view of various management authorities. Device management includes subsequent updates of persistent information in devices, retrieval of management information from devices and processing events and alarms generated by devices, but is not restricted to setting initial configuration information in devices.

Management Tree

Management tree is an interface by which a management server interacts with a DM client, e.g. by storing values in the management tree or retrieving values therefrom and by manipulating the properties of the management tree, for example, access control lists (ACLs). In the specification, the management tree may be used interchangeably with a device management tree or DM tree.

Management Object (MO)

A management object is a subtree of the management tree which is intended to be a (possibly singleton) collection of nodes which are related in some ways. For example, ./DevInfo Node and child nodes thereof can form a management object. A simple management object may consist of a single node.

DM Server or DMS (Device Management Server)

A DM server or DMS may be an abstract software component in a deployed device management infrastructure that conforms to OMA device management enabler static conformance requirements specified for the DM servers or DMS. The DM server or DMS can serve as an end-point of DM client-server protocols and DM server-server Interface.

Further, the DM server or DMS may be set in an apparatus, device, computer and the like, which include a communication module, processor module and the like, and thus the DM server or DMS can be implemented as one device.

DM Client or DMC (Device Management Client)

A DM client or DMC may be an abstract software component in a device implementation that conforms to the OMA device management enabler static conformance requirements specified for DM clients. The DM client or DMC can serve as an end-point of the DM client-server protocols.

Further, the DM client or DMC may be set in a device including a communication module, processor module and the like, which is a target of DM, and thus the DM client or DMC can be implemented as one device.

Access Control List (ACL)

An ACL is a list of DM server identifiers for a specific node in a management tree and access rights associated with each identifier.

Node

A Node is a single element in a management tree. There can be two kinds of nodes in a management tree: interior nodes and leaf nodes. The format property of a node provides information about whether the node is a leaf or an interior node.

Interior Node

An interior node may have child nodes but cannot store any value allocated thereto, that is, a node value. The format property of the interior Node is "node".

Leaf Node

A leaf node can store a node value but cannot have child nodes. The format property of the leaf Node is not "node". Accordingly, all parent nodes must be interior nodes.

Permanent Node

A permanent node is a node having DDF property scope set to "permanent". If a node is not a permanent node, the node corresponds to a dynamic node. The permanent node cannot be dynamically generated or deleted by a server Dynamic Node A dynamic node is a node having DDF property scope set to "dynamic" or having unspecified DDF property scope.

Sever Identifier

A server identifier refers to an OMA DM internal name for a DM server. A DM server is associated with a server identifier present in a device through an OMA DM account.

ACL Property and ACL Values

All terminals managed by the DM protocol have one DM tree starting with a root node and the DM protocol performs a management instruction for a terminal by operating each node of the DM tree. For example, to install downloaded software in a terminal, the software can be installed by executing a node "install" matched to the software. Each node may represent simple information such as a figure and complicated data such as picture data or log data. In addition, each node may represent one command such as "execute" or "download".

Each node has properties of providing meta information related thereto. The properties include a runtime during which the corresponding node can be used from generation of the node in a DM tree to extinction thereof. The runtime property includes ACL, format, name, size, title, TStamp, type and VerNo.

The ACL (Access Control List) is an indispensable function that both a terminal and a server need to execute in DM 1.3 protocol. The ACL specifies DM commands that a specific DM server can execute for a specific node. An unspecified DM command cannot be executed. In other words, the ACL refers to the authority permitted for a specific DM server for a specific node. In the DM protocol, the ACL is given to the server identifier of a DM server, instead of the URI and IP address of the DM server and DM server certificate. The server identifier is used as an identifier for authenticating the DM server in the DM protocol. In addition, the ACL can be provided as ACL properties and ACL values given to the ACL properties. In the specification, the ACL values can be interchangeably referred to as ACL information or information about the ACL. In the DM 1.3 protocol, all nodes have the ACL properties and nodes having the ACL properties are defined such that the nodes have empty ACL values or non-empty ACL values.

The ACL has unique properties including ACL inheritance, different from the runtime property. The ACL inheritance refers to acquisition of ACL values of a node in a DM tree from ACL values of the parent node of the node when the node in the DM tree does not have the ACL values. If the parent node does not have ACL values, then the ACL values are obtained from ACL values of the parent node of the parent node. Since the DM protocol specifies that the root node, the highest node of a DM tree, must have ACL values, the ACL values must be inherited. ACL inheritance from a parent node is performed only when ACL values are empty because ACL inheritance is carried out for total ACL values instead of for individual DM command. That is, when ACL values of a certain node specify only authority "Add", authority "get", which is not specified, is not inherited.

In the DM protocol, the root node has "Add=*&Get=*" as a basic value with respect to the ACL. Here, "*" is a wildcard and refers to an arbitrary DM server. The DM server uses the "Get" command in order to obtain an ACL value and the "Get" command with respect to "./NodeA/Node1?prop=ACL" gets ACL values of ./NodeA/Node1. Further, "Replace" command is used in order to replace ACL values. That is, ACL values are replaced by executing the "Replace" command on "./NodeA/Node1?prop=ACL" to change the value to "Add=DMS1&Delete=DMS1&Get=DMS1". In the DM protocol, an individual ACL entry cannot be changed but all ACL values can be changed at once. The authority to get and correct ACL values is defined on the basis of the ACL. Authorities for the interior node and the leaf node are defined differently.

Interior Node

If three are "Get" authority and "Replace" authority for the corresponding node, it is possible to get and replace ACL values of the corresponding node. The "Replace" authority refers to the authority to replace ACL values of all child nodes.

Leaf Node

If there is "Replace" authority for the parent node of the corresponding node, then ACL values of the corresponding node can be replaced. To get the ACL of the corresponding node, the "Get" authority for the parent node of the corresponding node is required. When the "Replace" authority for the corresponding node is present, ACL values of the corresponding node can be replaced. To replace the ACL of the corresponding node, the "Replace" authority for the parent node of the corresponding node is needed.

The authority to replace ACL values of a node can be controlled by ACL values of the parent node of the node irrespective of whether the node is an interior node or a leaf node. When the "Replace" authority for an interior node is present, not only ACL values of the interior node but also ACL values of all child nodes can be replaced. Accordingly, if the "Replace" authority for the root node is present, then any authority can be provided for all nodes in the DM tree. However, having the "Replace" authority for a parent node does not mean having a specific authority such as "Get" for a child node of the parent node and the "Get" authority needs to be directly specified for the child node. Therefore, ACL values need to be corrected prior to execution of a command and ACL values of the corresponding child node are finally corrected through correction of ACL values of all nodes on a path to the child node. This is inconvenient and thus the DM protocol allows direct correction of ACL values of a corresponding node without correction of ACL values of intermediate nodes when the "Replace" authority for the parent or ancestor node of the corresponding node is present.

When the DM server generates a new node through "Add" command, the generated node does not have ACL values in general and thus all authorities are inherited from a parent node of the node. However, when the generated node is an interior node and the authority "Replace" is not present for the parent node, it is necessary to have the authority to manage the corresponding node by setting ACL values of the node at the same time as when the node is generated.

The syntax for representing ACL values is defined in [DM-TND] and an example of ACL values is "Get=DMS1&Replace=DMS1&Delete=DMS2". Here, DMS1 and DMS2 are server identifiers of DM servers and Get, Replace and Delete are DM commands. Accordingly, DMS1 can execute the "Get" and "Replace" commands for the corresponding node and DMS2 can execute the "Delete" command. Here, Get=DMS1, Replace=DMS 1 and Delete=DMS2 are ACL-entries and represent individual command authorities of DM servers. That is, ACL values correspond to a set of ACL-entries and ACK values of each node may include at least one ACL entry.

DDF (Device Description Framework)

DDF is a specification for how to describe the management syntax and semantics for a particular device type. DDF provides information about MO of a terminal, management function and DM tree structure.

DM 1.3 Authentication

In DM 1.3, authentication is performed on the basis of the ACL. DM authentication is performed per DM command. When the DM server transmits a plurality of DM commands, a DM client (referred to as a DMC hereinafter) performs authentication prior to execution of an individual command and executes only a permitted DM command as a result of authentication.

DM Tree

DM tree may refer to a set of MO instances exposed by a DM client. The DM tree may function as an interface based on a management server interacting with a client. For example, the management server may store specific values from the DM tree, may retrieve the specific values, and may manipulate attributes of the DM tree.

MO Data

MO data may correspond to information regarding the DM tree. The information may relate to the entire parts of the DM tree, and may be some parts (e.g., a sub-tree of the MO instance) of the DM tree. In DM 2.0 protocol, the DM server may request MO data using ClientURI, and the MO data may be composed of a node name, a node value, and a node structure.

Resource Caching

Caching may refer to a technology for reducing unnecessary transmission of resources between a server and a client. The client may store previous responses from the server, and may reuse the stored data when requesting the same resources.

Cache Validator (CV)

The cache validator (CV) may be a component for verifying a cache. Cache verification may be a process for determining whether or not resources cached from the resource requester are the latest resources. The term "freshness" may indicate whether or not the resources are changed after being transmitted as the resource requester. A general example of the cache validator (CV) is an ETag and Last-Modified field used in the web cache.

MO Instance

MO instance may indicate the occurrence of a management object (MO) open to the public by the DM client. MO instances may share the same node definitions and behaviors, and may be denoted by a set (or aggregate) of associated nodes open to the public by the DM client. Multiple instances of a single MO may be present in the DM tree.

ClientURI

ClientURI may identify a specific node of the DM tree present in the UE. ClientURI may point out an interior node or a leaf node. Therefore, ClientURI may be denoted by an indicator or information for indicating a specific node.

HTTP Web Cache

HTTP is a protocol being widely used to transmit/receive resources on the web. In HTTP, HTTP commands (e.g., GET, DELETE, PUT, POST, etc.) are applied to resources called URI, such that the resources can be manipulated. For example, HTTP client must recognize the URI indicating the corresponding image file so as to obtain the image file present on the web. If the corresponding URI is denoted by http://www.server.com/a.jpg, a command HTTP GET is transmitted to the corresponding URI. The HTTP server may transmit the corresponding image file to the HTTP client in response to the HTTP HET command.

When the HTTP client re-requests the same downloaded resources in a subsequent process, assuming that the corresponding image file is not updated, the operation for re-transmitting the same resources to the HTTP client may be considered inefficient. As a representative method for addressing such inefficiency, the web cache has been widely used. The web cache may increase a response speed between the HTTP server and the HTTP client (i.e., the web cache may implement a low latency between the HTTP server and the HTTP client), and may reduce network traffic. For web caching, the HTTP client may store resources received from the HTTP server in a local storage (i.e., the HTTP client may perform local copying of the resources received from the HTTP server). When the HTTP client requests again the resources using the same URI, or when the corresponding resources are changed, the HTTP client may receive again the resources from the HTTP server. For this purpose, the procedure for determining whether the corresponding resources are changed is needed, and this procedure will hereinafter be referred to as a cache validation process or cache validation. The cache validation may be a process for verifying whether the cache is valid or has expired. An object for providing validity information regarding the cache in the cache validation procedure is referred to as a cache validator (CV). In HTTP, ETag and Last-Modified may be used as the cache validator (CV).

ETag may be a kind of an identifier (ID) given to a resource of a specific version by the HTTP server. The HTTP server may simultaneously transmit a resource indicated by the URI and an ETag value allocated to the resource when transmitting a response to the resource request. If the resource is changed (i.e., if the resource version is changed), the ETag value is also changed, and the ETag value received from the HTTP client is compared with the ETag value of the HTTP server during the cache validation process, such that it is determined whether the local copy of the HTTP client is the latest version.

If the latest version resource is owned by the HTTP client, the HTTP server need not retransmit the resource. The left table of FIG. 1 may conceptually show the web cache using ETag, and the right table of FIG. 1 may conceptual show the web cache using Last-Modified.

Figure 1:
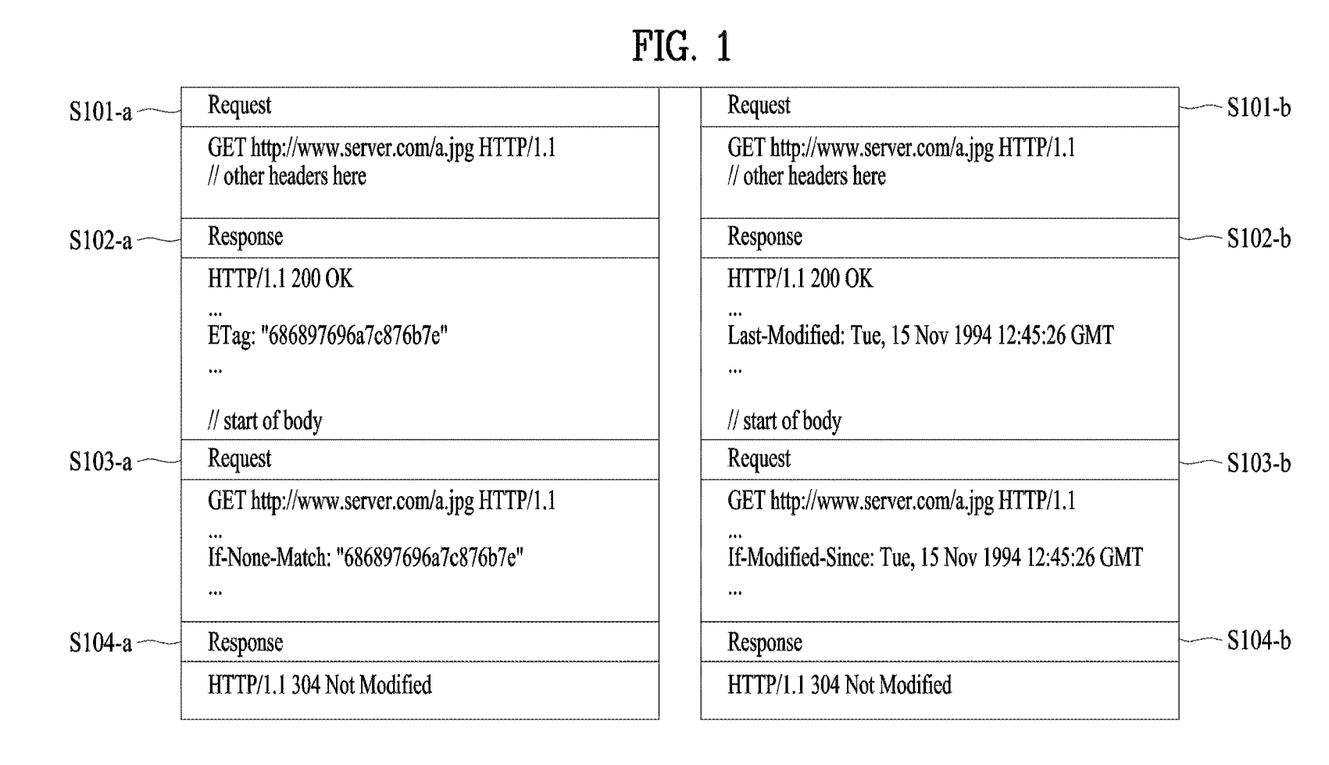
FIG. 1 exemplarily shows an HTTP web cache.

The HTTP client of the left table of FIG. 1 may request the image file resource "a. jpg" through a specific URI (http://www.server.com/a.jpg) in step S101-*a*. The HTTP server may include the HTTP header (such as ETag) into the image file acting as a requested resource, and then transmit the resultant image file in step S102-*a*. The ETag header may indicate the ETag value assigned to the image file resource of the current version. The HTTP client may receive a response message, may store the image file resource in a local storage (i.e., may perform local copying), and at the same time may also store the ETag value.

When the HTTP client sends a request message regarding the same URI, the stored ETag is contained in the request message using the HTTP header (i.e., If-None-Match) in step S103-*a*. The HTTP server receives this request message, and compares the received request message with the ETag value regarding the current version of the resource indicated by URI. If the received request message is identical to the ETag value, the fact that the resource is unchanged is applied to the HTTP client using a response code "304 Not Modified" in step S104-*a*. If the HTTP client receives a response message from the HTTP server, it is determined whether the resource stored in the HTTP client has the latest version, such that the latest version resource cannot be received again from the server.

Not only ETag but also Last-Modified may be used as a mainly used HTTP cache validator (CV). The basic operation of Last-Modified is almost similar to that of ETag as can be seen from the right table of FIG. 1. As compared to the basic operation of ETag, assuming that ETag is an arbitrary ID assigned to a resource of a specific version, Last-Modifier may indicate the last change time of the resource. That is, when the HTTP server transmits a resource to the HTTP client, the last change time of the resource, information regarding the last change time of resource is contained in the Last-Modified header of the HTTP, and then transmitted to a destination in step S102-*b*. When the HTTP client stores the resource and the Last-Modified value in a local storage and transmits a request to the same URI, the last change time of the received resource is contained in the If-Modified-Since header, and the resultant If-Modified-Since header is then transmitted in step S103-*b*. The HTTP server may update the resource change time whenever the resource is changed. Assuming that the request for the same URI includes the If-Modified-Since header, a time contained in the If-Modified-Since header is compared with the last resource change time, such that the requested resource is re-transmitted when the resource change is decided. If the resource is not changed, the response code "304 Not Modified" is transmitted in step S104-*b*.

DM 2.0 Based Resource Acquisition

Figure 2:
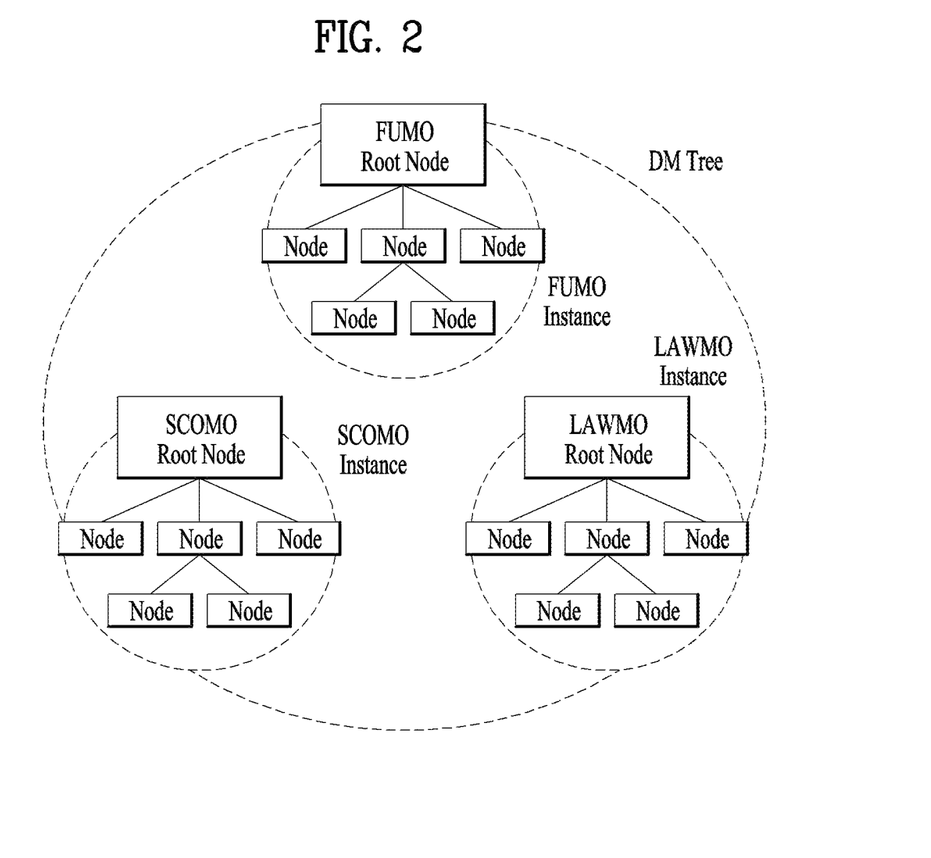
FIG. 2 exemplarily shows Management Object (MO) instances defined in Device Management (DM).

DM server may request transmission of information stored in the UE from the DM client. In OMA DM 2.0, this information is configured in the form of a DM tree such that the DM tree shaped information is stored in the UE. Generally, this DM tree shaped information is referred to as Management Object (MO) data. MO data may be the entire DM tree information, or may be stored in a single node. FIG. 2 exemplarily illustrates the DM tree stored in the UE in OMA DM 2.0. In OMA DM 2.0, MO instances (i.e., the set of MO associated nodes generated in UE) contained in the UE are not limited only to a hierarchical tree structure, because CLientURI indicating a node of the DM node designates the node address on the basis of the MO instances.

In OMA DM 2.0, a request for allowing the DM server to obtain MO data may be implemented by the GET command. When the DM server transmits the GET command to the DM client, ClientURI is also transmitted as a parameter of the GET command. Here, ClientURI may refer to a specific node of the DM tree. In order for the DM server to transmit the command to the DM client, Package#2 may be used, and Package#2 may include a plurality of DM commands. The following expression exemplarily shows Package#2 including two GET commands. The first GET command may request DevInfoManagement Object stored in the UE, and the second GET command may request IDs of all software components installed in the UE.

```
HTTP/1.1 200 OK
Content-Type: application/vnd.oma.dm.request+json
{
    "CMD": [
        ["GET", "oma:mo:oma-dm-devinfo:1.0//"],
        ["GET",
        urn:oma:mo:oma-scomo:1.0//Inventory/Deployed/*/ID"]
    ]
}
```

In the above example, the presence of two GET commands can be confirmed, and ClientURI may be located after the GET command. In other words, the first GET command is a command for requesting MO data regarding the entirety of DevInfo Management Object denoted by "oma:mo:oma-dm-devinfo:1.0//". The second GET command may request transmission of all installed software component IDs indicated by "um:oma:mo:oma-scomo:1.0//Inventory/Deployed/*/ID". Upon receiving this request, the DM client may transmit the requested MO data to the DM server through the following response message. Transmission of a response code to each command is achieved through Package#3. The DM client may transmit the following HTTP message as a response to Package#2.

```
POST /dmserver/dm20 HTTP/1.1
Content-Type: multipart/form-data; boundary=boundary
Accept: application/vnd.oma.dm.request+json
OMADM-DevID: IMEI:493005100592800
Host: www.dms.com
--boundary
Content-Disposition: form-data
Content-Type: application/vnd.oma.dm.response+json
{
    "Status": [
      200,
      200
    ]
}
--boundary
Content-Disposition: form-data; name="0"
Content-Type: application/dmmo+json
{
   "DDF": "http://www.vendor.com/DDF/devinfo1.0.ddf",
   "ClientURI": "oma:mo:oma-dm-devinfo:1.0//",
   "Data": {
      "DevInfo": {
         "DevID": "IMEI:493005100592800",
         "Man": "Vendor",
         "Mod": "DM_Client",
         "DmV": "2.0",
         "Lang": "en",
         "DevType": "smartphone",
         "OEM": "",
         "FwV": "android4.0.4",
         "SwV": "Vendor1.2",
         "HwV": ""
      }
   }
}
--boundary
Content-Disposition: form-data; name="1"
Content-Type: application/dmmo+json
{
  {
"DDF": "http://www.vendor.com/DDF/oma-scomo1.0.ddf",
   "ClientURI":"urn:oma:mo:oma-scomo:1.0//Inven-
   tory/Deployed/pkg1/ID",
      "MOData": {
         "ID": "pkg1_id"
      }
   },
  {
      "DDF":"http://www.vendor.com/DDF/oma-scomo1.0.ddf",
      "ClientURI":"urn:oma:mo:oma-scomo:1.0//Inven-
      tory/Deployed/pkg2/ID",
      "MOData": {
         "ID"; "pkg2_id"
      }
   }
}
--boundary--
```

In the above example, a response of the DM client may be achieved using the HTTP multipart. First encapsulation may include Package#3, second encapsulation may be a response to the first GET command, and third encapsulation may be a response to the second GET command. The DM server may request MO data from the DM client, and the DM client may transmit the requested MO data to the DM server.

As described above, if the DM client always transmits MO data requested by the DM server using the GET command, inefficiency may occur. That is, a time consumed to transmit the MO data is extended, and a response increases, such that unnecessary consumption of network resources may occur due to transmission of unnecessary data.

Example to which HTTP Web Cache is Applied to DM2.0

The HTTP web cache may also be applied to OMA DM 2.0 without change. For this purpose, the DM client may allocate the cache validator (CV) to all nodes of the DM tree and may manage the cache validators (CVs) in the same manner as in the scheme in which the cache validator (CV is allocated for each resource in HTTP and then managed). The DM server may request a DM GET command indicating a resource denoted by ClientURI from the DM client. If the cache validator (CV) is present, and if the requesting resource is not changed by additional transmission of the CV, a state code indicating that the resource is unchanged is received. Needless to say, assuming that the cache validator (CV) for the resource requested by ClientURI is not present, the request can be transmitted without using the cache validator (CV).

The following expression may indicate the GET command for requesting a FwV node (configured to store firmware version information of a device) of DevInfo MO. In case of using the first GET command for requesting the FwV node (resource), it will be expected that the DM server does not include a local cache and a cache validator (CV) regarding the local cache, such that the GET command can be transmitted as follows without using the cache validator (CV).

```
HTTP/1.1 200 OK
Content-Type: application/vnd.oma.dm.request+json
{
    "CMD": [
       ["GET", "oma:mo:oma-dm-devinfo:1.0//FwV"]
    ]
}
```

If the DM client receives the GET command, the cache validator (CV) is not present, such that the resource requested by the DM server is transmitted as follows. When the DM client transmits the resource, the cache validator (CV) regarding the resource may also be transmitted. The cache validator (CV) may be transmitted through the following CV key. Here, it is assumed that ETag is used as the cache validator (CV).

```
POST /dmserver/dm20 HTTP/1.1
Content-Type: multipart/form-data; boundary=boundary
Accept: application/vnd.oma.dm.request+json
OMADM-DevID: IMEI:493005100592800
Host: www.dms.com
--boundary
Content-Disposition: form-data
Content-Type: application/vnd.oma.dm.response+json
{
    "Status": [
      200
    ]
}
--boundary
Content-Disposition: form-data; name="0"
Content-Type: application/dmmo+json
{
    "DDF": "http://www.vendor.com/DDF/devinfo1.0.ddf",
    "ClientURI": "oma:mo:oma-dm-devinfo:1.0//FwV",
    "CV": "686897696a7c876b7e",
    "Data": {
       "FwV": "android4.0.4"
    }
}
--boundary--
```

Upon receiving the above-mentioned response from the DM client, the DM server may simultaneously store a UE firmware version "android4.0.4" and the CV "686897696a7c876b7e" regarding the resource. In this case, when the DM server requests the same resource in future, the DM server may request the resource request using the GET command. "686897696a7c876b7e" acting as the second parameter of the GET command may be used as the cache validator (CV).

---

HTTP/1.1 200 OK
Content-Type: application/vnd.oma.dm.request+json
{
   "CMD": [
     ["GET",
     oma:mo:oma-dm-devinfo:1.0//FwV","686897696a7c876b7e"]
   ]
}

---

When the DM client receives Package#2, the DM client performs cache validation. If the cache validation is decided, the status code 304 indicating "Not Modified" may be transmitted to the DM server. In this case, the DM recognizes that the local cache is still valid, such that the DM server may use "android.0.4" stored in the local cache. The following expression may indicate Package#3 indicating "304 Not Modified".

---

POST /dmserver/dm20 HTTP/1.1
Content-Type: application/vnd.oma.dm.response+json
Accept: application/vnd.oma.dm.request+json
OMADM-DevID: IMEI:493005100592800
Host: www.dms.com
{
   "Status": [
     304
   ]
}

---

If the DM client recognizes that the cache is no longer valid through the cache validation process, the DM client transmits a resource such that it can also transmit the cache validator (CV) corresponding to the resource. The following expression may indicate Package#3 regarding the above case.

---

POST /dmserver/dm20 HTTP/1.1
Content-Type: multipart/form-data; boundary=boundary
Accept: application/vnd.oma.dm.request+json
OMADM-DevID: IMEI:493005100592800
Host: www.dms.com
--boundary
Content-Disposition: form-data
Content-Type: application/vnd.oma.dm.response+json
{
   "Status": [
     200
   ]
}
--boundary
Content-Disposition: form-data; name="0"
Content-Type: application/dmmo+json
{
   "DDF": "http://www.vendor.com/DDF/devinfo1.0.ddf",
   "ClientURI": "oma:mo:oma-dm-devinfo:1.0//FwV",
   "CV": "6a7c876b7e68689769",
   "Data": {
     "FwV": "android4.0.5"
   }
}
--boundary--

---

If the HTTP web cache is immediately applied to OMA DM 2.0, the DM client must assign the cache validator (CV) to all resources, such that an unexpected problem occurs in management of a plurality of cache validators (CVs) and the overall protocol becomes heavy. In addition, when the CV is assigned to the interior node, it is difficult to define the range of a resource, validity of which must be verified by the corresponding cache calidator (CV). That is, the cache validator (CV) allocated to the interior node may have difficulty in updating the cache validator (CV) when a child node or a descendant node is updated.

In addition, since the cache validator (CV) is allocated to all resources, an unexpected problem occurs when ClientURI ("urn:oma:mo:oma-scomo:1.0//Inventory/Deployed/*/ID") indicating a plurality of nodes is used in the GET command in the same manner as in the example "DM 2.0 based resource acquisition". That is, since ClientURI indicates a plurality of nodes, it is impossible to select which CV will be transmitted using the GET command. In addition, it is impossible for the DM server to recognize how many nodes are designated as ClientURI, such that the CV cannot be selected.

In addition, although a method for selectively allocating the cache validator (CV) to some resources without allocating the CV to all resources may be used, information indicating which resource will be used to receive the CV may cause unexpected problems, or information indicating which scheme will be used for version or update management by a resource to which the CV is not allocated may also cause unexpected problems.

In order to address the above-mentioned issue of the conventional art, one embodiment of the present invention will hereinafter be described in detail.

Figure 3:
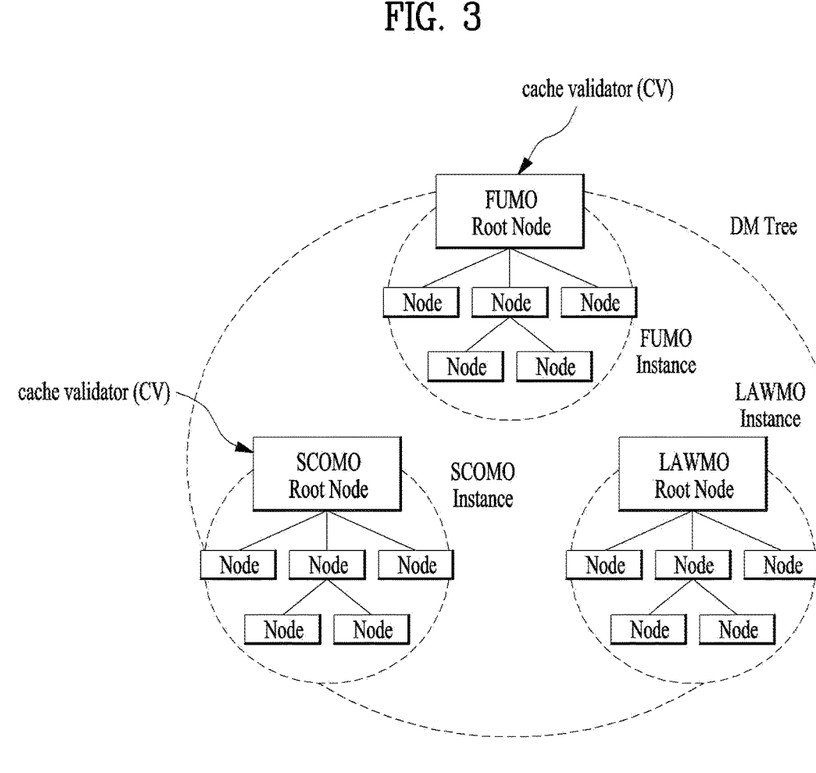
FIG. 3 shows an allocation example of MO instance-specific cache validator (CV) according to an embodiment of the present invention.

FIG. 3 shows an allocation example of the cache validator (CV) according to an embodiment of the present invention.

The CV is an entity for providing validity information regarding a local cache owned by the server. In other words, the CV may provide the latest information regarding the local cache. As a representative example of the CV, time information (Last-Modified), ETag, or the like may be used. In accordance with the embodiment of the present invention, the CV is allocated only to the MO instance as shown in FIG. 3. However, the CV is not always allocated to all MO instances contained in the DM tree, and the MO instance is selected such that the CV may be allocated only to a necessary MO instance. FIG. 3 exemplarily shows that the CV is allocated to two MO instances (i.e., FUMO instance and SCOMO instance) from among three MO instances present in the UE DM tree.

The MO instance to which the CV is allocated will hereinafter be referred to as a cacheable MO instance. In order to use the cache, the cacheable MO instance must first be selected by the UE (or DM client) or must first be selected by the DM server, and the CV must be allocated to the selected MO instance such that the allocation result must be managed. In association with each cacheable MO instance, the DM client must allocate the CV at all times, and the allocated CV must be updated whenever data (i.e., a node value is changed, addition and deletion of a new node, a change of a node name, etc.) of the MO instance is changed.

If the CV is allocated only to the MO instance, the method for requesting/providing the resource using the cache can be effectively carried out.

The cache validation process may determine whether or not the cache or the cache copy is valid. Since the cache validator (CV) is allocated to the cacheable MO instance, cache validation must return "success" or "true" when any of data in the cacheable MO instance is unchanged, and cache validation must return "false" when any of data is changed. For example, if the cache validator (CV) is ETag, the ETag value transmitted from the DM server is compared with the ETag value of the corresponding MO instance managed by the UE, such that the cache validation process can be carried out. If the ETag value received from the DM server is identical to the ETag value managed by the UE, the UE may return the success. If the ETag value received from the DM server is different from the ETag value managed by the UE, the UE may return the failure.

Although the cache validator (CV) is allocated to the MO instance, the CV may be used to transmit the GET command to all nodes contained in the MO instance. For example, even when ClientURI is applied to the GET command for a specific leaf node, the DM server may transmit the CV for the MO instance. The DM client may determine or verify whether the MO instance is not changed through the received CV. If the MO instance is not changed, the specific leaf node will not be changed, such that the code of "304 Not Modified" may be applied to the DM server. The DM server having received the code of "304 Not Modified" may refer to the local cached data.

Although various methods for transmitting the CV to the DM client can be used in the embodiment of the present invention, it should be noted that the cv field capable of being contained in ClientURI is applied to the embodiment. In the case of using the cv field, the CV need not be transmitted as a separate parameter, the CV should be incorporated with ClientURI such that the resultant ClientURI is transmitted to the destination and resource requesting can be facilitated. Since ClientURI indicates a specific node, the CV regarding the MO instance including the corresponding specific node is transmitted through the cv field. ClientURI including the cv field may be identical to "oma:mo:oma-dm-devinfo:1.0// FwV?cv=686897696a7c876b7e". Since ClientURI indicates "FwV" node of DevInfo MO and this node is contained in the DevInfo MO instance, the CV "686897696a7c876b7e", the CV "686897696a7c876b7e" acting as a value transmitted as the cv field may be used as the CV regarding the DevInfo MO instance.

Figure 4:
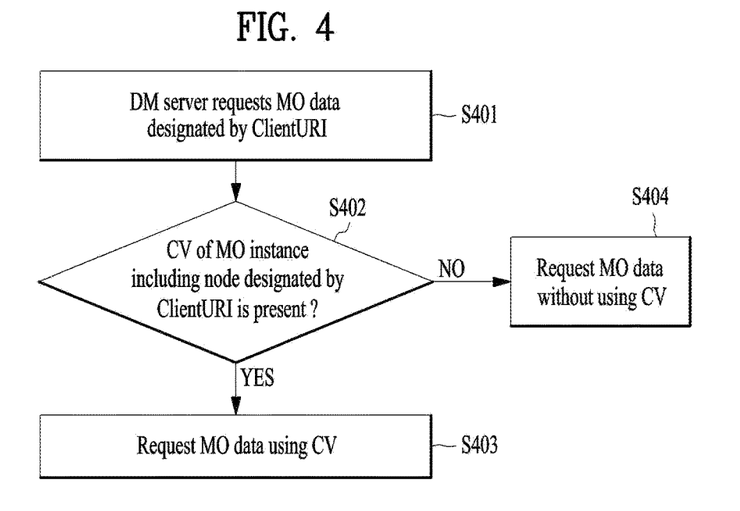
FIG. 4 is a flowchart illustrating a method for requesting a resource according to an embodiment of the present invention.

FIG. 4 is a flowchart illustrating a method for requesting a resource using the CV allocated to the MO instance according to an embodiment of the present invention.

Referring to FIG. 4, the DM server may decide to request MO data (resource) denoted by ClientURI in step S401. For the above requesting, the GET command may be used.

Thereafter, it may be determined whether the DM server includes the CV regarding the MO instance including a node denoted by ClientURI in step S402.

Assuming that the DM server has the CV regarding the MO instance including the node denoted by ClientURI, the DM server includes the cv field in ClientURI, and then transmits the DM command in step S403. The cv field may transmit the CV regarding the corresponding MO instance. The CV may use a command for acquiring a resource, such that the CV can be used for DM GET/HPUT/HPOST commands.

Assuming that the DM server does not include the CV regarding the MO instance including the node denoted by ClientURI, the DM server may transmit the resource request command to the DM client without using the cv field in step S403.

Figure 5:
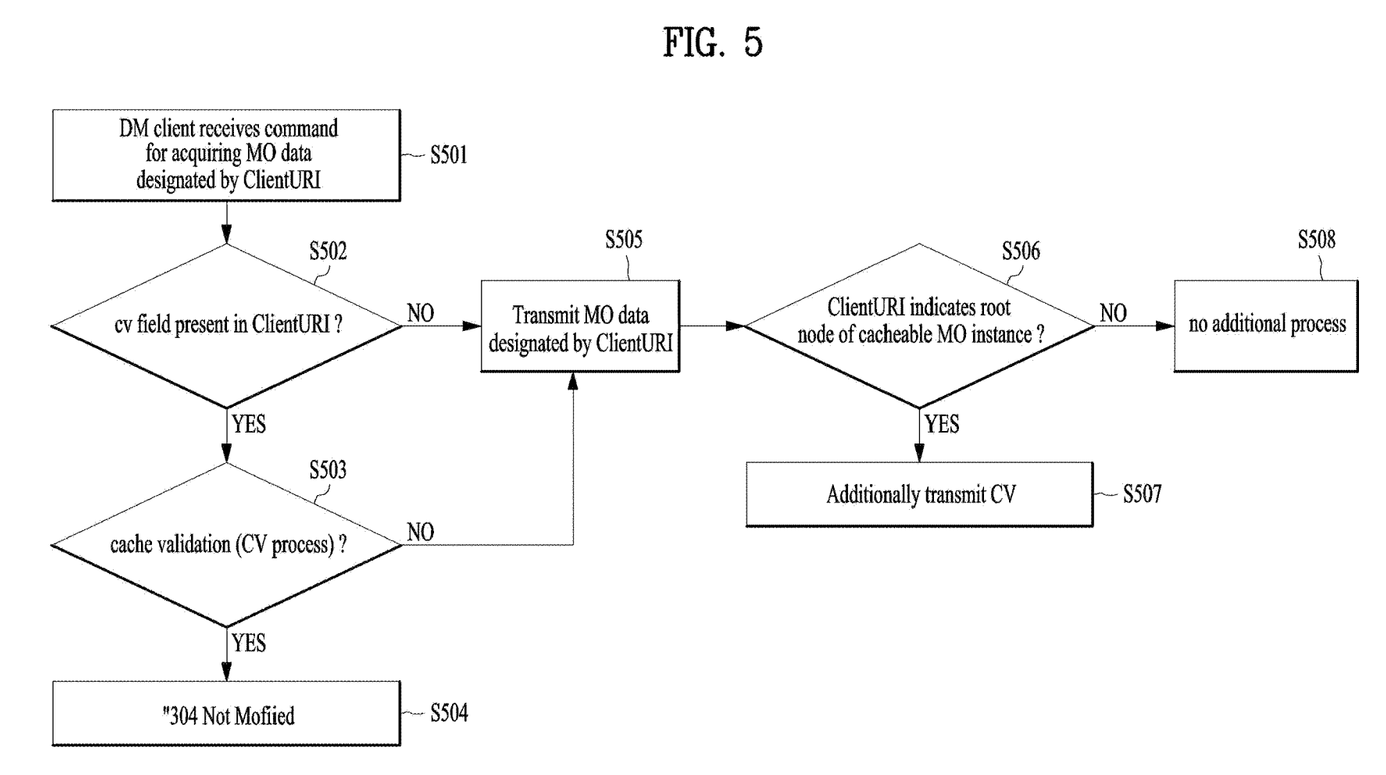
FIG. 5 is a flowchart illustrating a method for providing a resource according to an embodiment of the present invention.

If the DM server requests the resource, the DM client (UE) may perform the following processing using the method shown in FIG. 5.

FIG. 5 is a flowchart illustrating a method for answering or processing the resource request using the CV allocated to the MO instance according to an embodiment of the present invention.

Referring to FIG. 5, the DM client may receive the DM command for acquiring the resource (MO data) from the DM server in step S501. The DM command for requesting the resource is one of the GET/HPUT/HPOST commands, and the DM command may also transmit the parameter denoted by ClientURI. The resource acquisition command may be interpreted as a command for requesting MO data regarding the node denoted by ClientURI.

The DM client may determine whether ClientURI of the CM command has the cv field in step S502.

Assuming that ClientURi of the DM command includes the cv field, the DM client may perform the cache validation process in step S503. In the cache validation process, assuming that MO data corresponding to the CV received from the cv field is not changed, the success should be returned. If at least some parts of the MO data is changed, the failure should be returned. When using ETag as an example, during the cache validation process, the DM client may determine whether the CV (hereinafter referred to as a first CV) received through the cv field is identical to the CV (hereinafter referred to as a second CV) stored or present in the DM client. If the first CV is identical to the second CV, the above process indicates the success. If the first CV is different from the second CV, the above process indicates the failure. This cache validation process may be changed in various ways according to CV categories.

For convenience of description and better understanding of the present invention, the CV is classified into a first CV and a second CV. Briefly, the first CV is a CV stored in the DM server, and the second CV is a CV stored in the DM client (i.e., UE). Although the first CV is retrieved from the second CV, the CV stored in the DM server will hereinafter be referred to as a first CV, and the CV stored in the DM UE will hereinafter be referred to as a second CV. The reason why the first CV is retrieved from the second CV is that the CV regarding the set of specific MO instances (i.e., MO associated nodes) is allocated by the DM UE, and the DM server having no CV does not include the cv field in the ClientURI for the above request when a specific resource is requested, such that the CV can be initially received from the DM server.

If MO data is unchanged, i.e., if the cache validation process returns the success (when using the ETag CV, if the first CV is identical to the second CV, the success may be returned), the DM client may transmit "304 Not Modified" to the DM server, and may not transmit the requested MO data to the DM server. The DM server having received this response may use the local cache or may refer to the local cache.

If ClientURI of the DM command does not include the cv field, the DM client may transmit MO data denoted by ClientURI to the DM server in step S505. In addition, if the cache validation process indicates the failure in step S503, i.e., if the cv field (i.e., a first CV) of the corresponding MO data owned by the DM server is different from the cv field (i.e., second CV) of the corresponding MO data managed by the DM client, the DM client may transmit MO data denoted by ClientURI to the DM server in step S505.

Meanwhile, if the cv field (briefly, CV) contained in the DM command requesting the resource is not contained or if the cache validation process indicates the failure, the DM client may transmit the resource (i.e., MO data) to the DM server. In addition, information indicating whether CV will be transmitted may be determined. In contrast, according to the related art, if the CV stored in the DM server is different from the CV managed by the DM client due to a certain reason (e.g., updating), not only the corresponding resource but also the CV managed by the DM client may be transmitted to the DM server.

In addition, in order to determine whether CV will be transmitted, the DM client may determine whether the DM command (especially, ClientURI) indicates the root node of the cacheable MO instance in S506. that is, the DM client may determine whether the MO instance including the node denoted by ClientURI is the cacheable MO instance, or may determine whether the node denoted by ClientURI is a root node of the cacheable MO instance.

If ClientURI indicates the root node of the MO instance and the MO instance indicates the cacheable MO instance, the DM client may additionally transmit the CV regarding the MO instance to the DM server in step S507. In this case, the response process of the DM client is ended. The DM server may store the CV, such that it may use the stored CV when MO data is requested in a subsequence process.

If ClientURi does not indicate the root node of the MO instance, or if the MO instance is not identical to the cacheable MO instance, the DM client may not additionally transmit the CV to the DM server in step S508.

The DM client may transmit the CV to the DM server in step S507. The CV may be transmitted along with MO data. If ClientURI indicates the root node of the cacheable MO instance, the CV is transmitted to the DM server. If ClientURI does not indicate the root node of the cacheable MO instance, there is no need to transmit the CV. The CV provides validity information regarding the entire MO instance. If the DM server receives only some parts of the MO instance, an unexpected problem occurs in validity verification of the DM client in a subsequent process, such that the CV can provide validity information regarding the entire MO instance.

That is, assuming that the resource requested by the DM server is a node (resource) located below the root node of the MO instance and other resource(s) of the requested resource is(are) changed, and assuming that the second CV in which the changed resource (the changed resource is not transmitted to the DM server because the DM server does not request the changed resource) is reflected is transmitted to the DM server when the DM client transmits the requested resource to the DM server, the DM server cannot acquire other resources (which has not been obtained by the DM server although the other resources are changed in the UE) other than the requested resources, such that the CV function may be lost or disappear.

Figure 6:
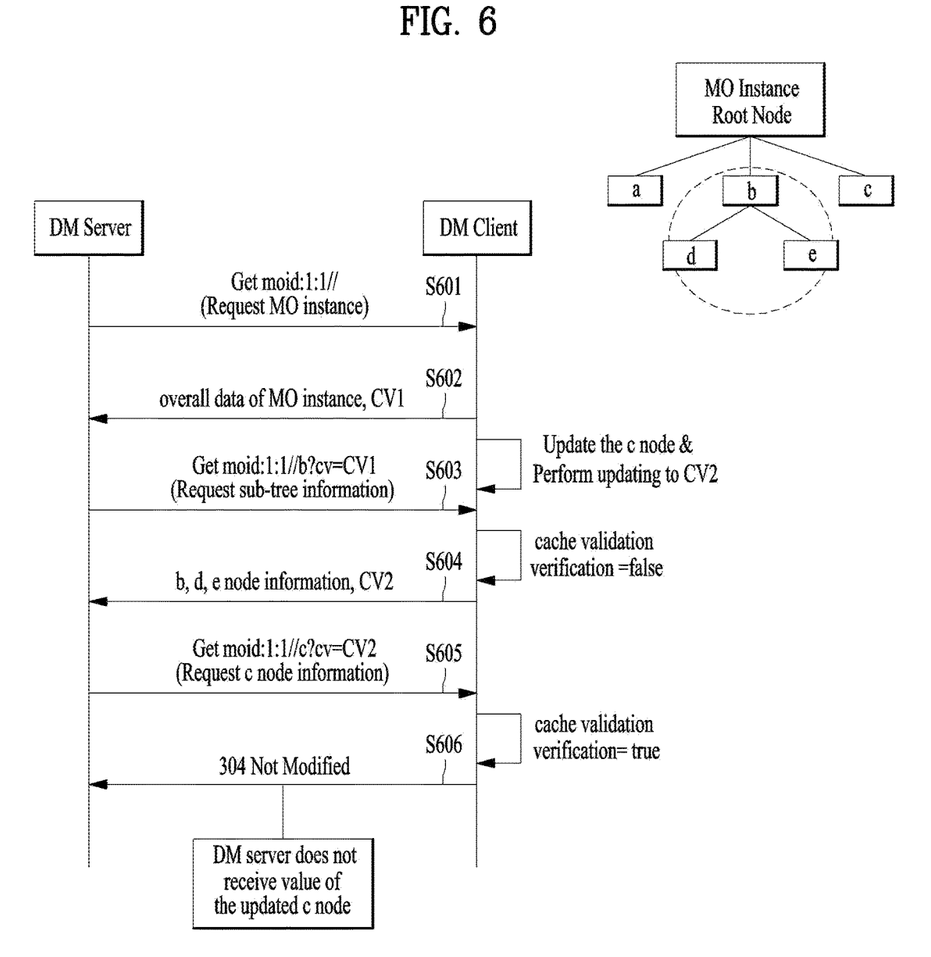
FIG. 6 is a flowchart illustrating another method compared with the method according to another embodiment of the present invention.

The above-mentioned validity verification problem will hereinafter be described with reference to FIG. 6. FIG. 6 exemplarily illustrates that the DM server includes not only a request for the root node of the cacheable MO instance toward the DM client but also a request for a resource instead of the root node.

The DM server may request the MO instance in which ClientURI "moid:1.1" is used as MO ID from the DM client in step S601. ClientURI "moid:1.1//" may indicate the root node of the corresponding MO instance. The MO instance owned by the UE may be shown at the upper right side of FIG. 6.

The DM client may transmit the MO instance overall data requested by the DM server, and may transmit the CV "CV1" allocated to the MO instance to the DM server in step S602. The DM client may change the name of the C node such that it can update the C node. Thereafter, since information of the MO instance (i.e., information regarding the c node) is changed, the CV is updated to CV2 in step S603.

The DM server may request the interior node (b) and the sub node of the interior node (b) using ClientURI "moid: 1.1//b?cv=CV1" in step S604. In this case, "CV1" received in step S602 may be transmitted to the DM client through the cv field.

Thereafter, the DM client may perform the cache validation process on the basis of the received CVI in step S605. That is, the DM client may determine whether or not CV1 is valid. In step S603, the DM client may update MO instance information, such that the DM client may update the CV to CV2. Therefore, the DM client may determine that cache validation has failed because CV1 received from the DM server in step S604 is different from the CV owned by the DM client. In this example, it is assumed that the CV is ETag for convenience of description and better understanding of the present invention.

Therefore, the DM client may transmit not only information (i.e., node b and sub nodes d and e) requested in step S604, but also CV2 owned by the DM client to the DM server in step S606. The embodiment shown in FIG. 5 does not allow CV2 transmission in step S606, configures CV2 transmission, and shows the problems. In other words, differently from the embodiment shown in FIG. 5, the DM client may transmit the CV to the DM server although the request from the DM server is not identical to the request of the root node of the MO instance in step 606.

As a result, the DM server may store the CV (i.e., CV2) (i.e., the DM server may update CV1 to CV2).

The DM server may request information regarding the C node using "ClientURI "moid:1.1//c?cv=CV2" in step S607. In this case, the DM server may configure the CV2 received from the DM client in the form of the cv field, and may transmit the resultant CV field including CV2 in step S606.

In step S608, the DM client may perform the cache validation process for verifying the CV received from the DM server in the same manner as in S605. Since the CV owned by the DM client is denoted by CV2, the DM client may determine that the CV (i.e., CV2) received from the DM server is valid, such that the cache validation process is determined to be the success. Since the cache validation process indicates the success, the DM client may transmit the response code "304 Not Modified" to the DM server in step S609.

Although the DM server does not have the latest information of the updated C node, the DM server receives the response "304 Not Modified" in step S609, such that the DM server misunderstands that the DM server has the latest information of the C node, resulting in occurrence of unexpected problems. Although the request of the DM server is not used for the root node of the MO instance, the DM client transmits the CV (CV2) to the DM server in step S606, resulting in occurrence of unexpected problems. Since CV2 is used when the DM server requests information regarding the C node in step S607, the DM client misunderstands that the DM server has the latest information regarding the C node, such that updated information of the C node is not transmitted to the DM server. In order to prevent the occurrence of such problems, the CV regarding one C node may be contained in the request of step S607. However, the above-mentioned method is similar to the HTTP web cache method in which the CV is present in each sub-tree, such that the mechanism in which CV is managed and resources are requested or answered becomes complicated.

However, according to the embodiment shown in FIG. 5, the CV is selectively allocated only to the MO instance, processing load caused by CV allocation can be reduced, and the cache validation process using the CV can be easily and efficiently carried out.

That is, differently from the conventional art in which the CV is allocated to each resource, the CV is allocated only to the MO instance, and the complicated problem indicating which node will be used for CV allocation can be addressed. In addition, in order to share the latest characteristic of all resources through the CV allocated to the MO instance, CV (i.e., second CV) stored in the DM UE is not transmitted to the DM server at all times although CV (i.e., first CV) from the DM server is no longer valid. In this case, it is determined which resource has been used so as to determine transmission or non-transmission of the second CV. Only when the predetermined resource is used, the DM UE may transmit the second CV to the DM server.

One embodiment of the present invention will hereinafter be described in detail.

The following expression may indicate the GET command for requesting the FwV node (configured to store device firmware version information) of DevInfo MO. Assuming that the first GET command for requesting the FwV node is used, it is expected that the local cache does not include the local cache and the cache validator (CV) associated with the local cache, such that the GET command can be transmitted without using the CV.

```
HTTP/1.1 200 OK
Content-Type: application/vnd.oma.dm.request+json
{
    "CMD": [
        ["GET", "oma:mo:oma-dm-devinfo:1.0//FwV"]
    ]
}
```

If the DM client receives the GET command, there is no CV, such that the resource requested by the DM server is transmitted. When the DM client transmits the resource, the DM client may also transmit the CV regarding the resource. In this case, the CV may be transmitted through the following CV key. For convenience of description and better understanding of the present invention, it is assumed that ETag is used as the CV.

```
POST /dmserver/dm20 HTTP/1.1
Content-Type: multipart/form-data; boundary=boundary
Accept: application/vnd.oma.dm.request+json
OMADM-DevID: IMEI:493005100592800
Host: www.dms.com
--boundary
Content-Disposition: form-data
Content-Type: application/vnd.oma.dm.response+json
{
    "Status": [
        200
    ]
}
--boundary
Content-Disposition: form-data; name="0"
Content-Type: application/dmmo+json
{
    "DDF": "http://www.vendor.com/DDF/devinfo1.0.ddf",
    "ClientURI": "oma:mo:oma-dm-devinfo:1.0//FwV",
    "CV": "686897696a7c876b7e",
    "Data": {
        "FwV": "android4.0.4"
    }
}
--boundary--
```

Upon receiving the above-mentioned response from the DM client, the DM server may also store not only a UE firmware version "android4.0.4" but also the CV "686897696a7c876b7e" regarding the resource. In this case, when the DM server requests the same resource, the DM server may request the resource using the following GET command. "686897696a7c876b7e" transmitted to the CV field of ClientURI may be used as the CV.

```
HTTP/1.1 200 OK
Content-Type: application/vnd.oma.dm.request+json
{
    "CMD": [
        ["GET",
        "oma:mo:oma-dm-devinfo:1.0//FwV?cv=686897696a7c876b7e"]
    ]
}
```

After the DM client performs cache validation when receiving Package#2, if it is determined that the cache is considered valid, the status code 304 indicating "Not Modified" is transmitted to the DM server. In this case, since the DM server recognizes that the local cache is still valid, the DM server may use "android4.0.4" stored in the local cache. The following expression may show Package#3 indicating "304 Not Modified".

```
POST /dmserver/dm20 HTTP/1.1
Content-Type: application/vnd.oma.dm.response+json
Accept: application/vnd.oma.dm.request+json
OMADM-DevID: IMEI:493005100592800
Host: www.dms.com
{
    "Status": [
        304
    ]
}
```

If the DM client recognizes that the cache is no longer valid through the cache validation process, the DM client may transmit the resource. The following expression shows Package#3 regarding the above case.

```
POST /dmserver/dm20 HTTP/1.1
Content-Type: multipart/form-data; boundary=boundary
Accept: application/vnd.oma.dm.request+json
OMADM-DevID: IMEI:493005100592800
Host: www.dms.com
--boundary
Content-Disposition: form-data
Content-Type: application/vnd.oma.dm.response+json
{
    "Status": [
        200
    ]
}
--boundary
Content-Disposition: form-data; name="0"
Content-Type: application/dmmo+json
{
    "DDF": "http://www.vendor.com/DDF/devinfo1.0.ddf",
    "ClientURI": "oma:mo:oma-dm-devinfo:1.0//FwV",
    "Data": {
        "FwV": "android4.0.5"
    }
}
--boundary--
```

Figure 7:
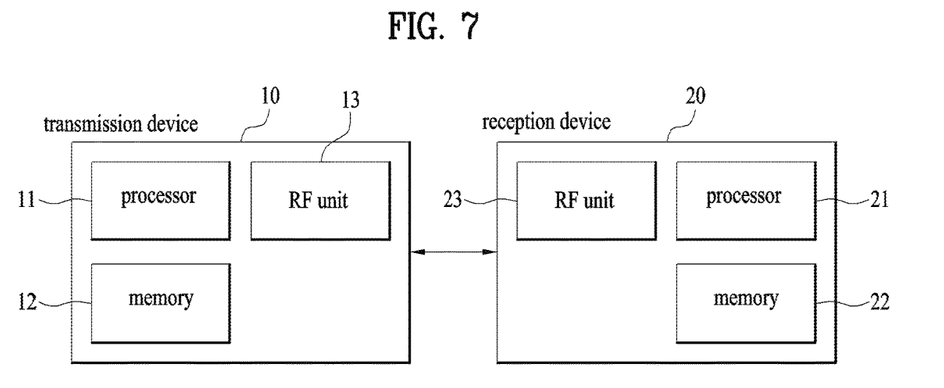
FIG. 7 is a block diagram of an apparatus for implementing embodiment(s) of the present invention.

FIG. 7 is a block diagram for a device configured to implement embodiment(s) of the present invention. A transmission device 10 and a reception device 20 includes an RF (radio frequency) unit 13/23 configured to transmit or receive a radio signal carrying information and/or data, a signal, a message and the like, a memory 12/22 configured to store various information related to communication in a communication system and a processor 11/21 configured to be operably connected with such a component as the RF unit 13/23, the memory 12/22 and the like, the processor configured to control the memory 12/22 and/or the RF unit 13/23 to enable the corresponding device to perform at least one of the embodiments of the present invention by controlling the components, respectively.

The memory 12/22 can store a program for processing and controlling the processor 11/21 and temporarily store inputted/outputted information. The memory 12/22 can be utilized as a buffer.

The processor 11/21 generally controls overall operation of various modules included in the transmission device or the reception device. In particular, the processor 11/21 can perform various control functions to perform the present invention. The processor 11/21 can be named by such a terminology as a controller, a microcontroller, a microprocessor, a microcomputer or the like. The processor 11/21 can be implemented by hardware, software or a combination thereof. In case of implementing the present invention using hardware, the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays) installed in the processor 11/21. Meanwhile, in case of implementing the present invention using firmware or software, the present invention can be implemented by modules, procedures, and/or functions for performing the above-explained functions or operations included in the firmware or the software. The firmware or the software configured to perform the present invention is installed in the processor 11/21 or stored in the memory 12/22 and can be driven by the processor 11/21.

In embodiments of the present invention, a terminal or a device, a server or a gateway may operate as a transmission device 10 and a DMC, a DMS or a DM gateway may operate as a reception device 20.

Concrete configuration of the reception device and the transmission device can implement items explained by various embodiments of the present invention mentioned earlier with reference to the attached drawings in a manner of being independently applied. Or, two or more embodiments can be applied at the same time.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

The embodiments of the present invention can be applied to wireless communication devices, for example, UE, BS (or eNB), server, etc.

What is claimed is:

1. A method for processing a request of Management Object (MO) data using a first or a second cache validator (CV) allocated to an MO instance, wherein the method is performed by a mobile terminal, the MO instance is composed of a tree structure including one or more nodes, and the MO data includes a name, a value, and a structure of a node included in the MO instance, the method comprising:
   receiving the request including Uniform Resource Identifier (URI) information identifying MO data for acquiring the MO data of the MO instance from a server; and
   determining whether the first CV for the MO instance is included in the URI information, wherein the first CV indicates that the MO data is latest MO data of the MO instance,
   wherein, when the first CV is not included in the URI information, the method further comprises:
   transmitting the requested MO data to the server; and
   when the URI information indicates a root node of the MO instance, transmitting the second CV for the MO instance, wherein the second CV indicates that the MO data is latest MO data of the MO instance, and when the URI information does not indicate the root node of the MO instance, the second CV for the MO instance is not transmitted,
   wherein when the first CV is included in the URI information, the method further comprises:
   verifying the first CV;
   transmitting the requested MO data to the server when the first CV is verified as not valid, and
   when the URI information indicates the root node of the MO instance, transmitting the second CV for the MO instance, and when the URI information does not indicate the root node of the MO instance, the second CV for the MO instance is not transmitted.

2. The method according to claim 1, further comprising: transmitting a result indicating validity of the first CV to the server when the first CV is verified as valid.

3. The method according to claim 1, further comprising: when the MO instance is changed, updating the second CV for the MO instance.

4. The method according to claim 1, wherein the MO instance is cacheable.

5. The method according to claim 1, wherein the first CV is provided by a specific field included in the URI.

6. The method according to claim 2, wherein: when the MO instance is not changed, the first CV is verified as valid.

7. A method for requesting Management Object (MO) data using a first or a second cache validator (CV) allocated to an MO instance, wherein the method is performed by a server, the MO instance is composed of a tree structure including one or more nodes, and the MO data includes a name, a value, and a structure of a node included in the MO instance, the method comprising:
   transmitting the request including Uniform Resource Identifier (URI) information identifying MO data for acquiring the MO data of the MO instance to a mobile terminal;
   wherein the URI information includes the first CV for the MO instance when the server has information about the first CV for the MO instance, wherein the first CV indicates that the MO data is latest MO data of the MO instance, and
   the URI information does not include the first CV for the MO instance when the server does not have the information about the first CV for the MO instance, and
   when the first CV is not included in the URI information, receiving the requested MO data from the mobile terminal, and when the URI information indicates a root node of the MO instance, receiving the second CV for the MO instance, wherein the second CV indicates that the MO data is latest MO data of the MO instance, and when the URI information does not indicate the root node of the MO instance, the second CV for the MO instance is not transmitted, wherein when the first CV is included in the URI information, the method further comprises:

receiving the requested MO data from the mobile terminal when the first CV is verified as not valid, and receiving the second CV for the MO instance from the mobile terminal when the URI information indicates the root node of the MO instance, and when the URI information does not indicate the root node of the MO instance, the second CV for the MO instance is not received from the mobile terminal.

8. The method according to claim 7, further comprising:

receiving a result indicating validity of the first CV from the mobile terminal when the first CV is verified as valid.

9. The method according to claim 7, wherein:

when a specific resource included in the MO instance is changed, the second CV for the MO instance is updated.

10. The method according to claim 7, wherein the MO instance is cacheable.

11. The method according to claim 7, wherein the first CV is provided by a specific field included in the URI.

12. The method according to claim 8, wherein:

when the MO instance is not changed, the first CV is verified as valid.

13. A mobile terminal for processing a request of Management Object (MO) data using a first or a second cache validator (CV) allocated to an MO instance, wherein the MO instance is composed of a tree structure including one or more nodes, and the MO data includes a name, a value, and a structure of a node included in the MO instance, the mobile terminal comprising:

a radio frequency (RF) unit; and a processor that controls the RF unit, wherein the processor controls the RF unit to receive the request including Uniform Resource Identifier (URI) information identifying MO data for acquiring the MO data of the MO instance from a server, and determines whether the first CV for the MO instance is included in the URI information, wherein the first CV indicates that the MO data is latest MO data of the MO instance, and wherein the processor controls the RF unit to transmit the MO data to the server when the first CV is not included in the URI information, and transmit the second CV for the MO instance when the URI information indicates a root node of the MO instance, wherein the second CV indicates that the MO data is latest MO data of the MO instance, wherein when the first CV is included in the URI information, the processor further:

verifies the first CV;

controls the RF unit to transmit the requested MO data to the server when the first CV is verified as not valid, and when the URI information indicates the root node of the MO instance, controls the RF unit to transmit the second CV for the MO instance, and when the URI information does not indicate the root node of the MO instance, the second CV for the MO instance is not transmitted.

14. A server for requesting Management Object (MO) data using a first or a second cache validator (CV) allocated to an MO instance, wherein the MO instance is composed of a tree structure including one or more nodes, and the MO data includes a name, a value, and a structure of a node included in the MO instance, the server comprising:

a radio frequency (RF) unit; and a processor that controls the RF unit, wherein the processor controls the RF unit to transmit the request including Uniform Resource Identifier (URI) information identifying MO data for acquiring the MO data of the MO instance to a mobile terminal, and wherein the URI information includes the first CV for the MO instance when the server has information about the first CV for the MO instance, wherein the first CV indicates that the MO data is latest MO data of the MO instance, and the URI information does not include the first CV for the MO instance when the server does not have the information about the first CV for the MO instance, controls the RF unit to receive the requested MO data from the mobile terminal when the first CV is not included in the URI information, and receive the second CV for the MO instance when the URI information indicates a root node of the MO instance, wherein the second CV indicates that the MO data is latest MO data of the MO instance, wherein when the first CV is included in the URI information, the processor further:

controls the RF unit to receive the requested MO data from the mobile terminal when the first CV is verified as not valid, and controls the RF unit to receive the second CV for the MO instance from the mobile terminal when the URI information indicates the root node of the MO instance, and when the URI information does not indicate the root node of the MO instance, the second CV for the MO instance is not received from the mobile terminal.

* * * * *